US009332000B2

(12) United States Patent
Lei et al.

(10) Patent No.: US 9,332,000 B2
(45) Date of Patent: May 3, 2016

(54) ONE-PASS AUTHENTICATION MECHANISM AND SYSTEM FOR HETEROGENEOUS NETWORKS

(75) Inventors: Zhengxiong Lei, Shanghai (CN); Xueqiang Yan, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1200 days.

(21) Appl. No.: 12/735,588

(22) PCT Filed: Feb. 21, 2008

(86) PCT No.: PCT/CN2008/000372
§ 371 (c)(1),
(2), (4) Date: Jul. 29, 2010

(87) PCT Pub. No.: WO2009/103188
PCT Pub. Date: Aug. 27, 2009

(65) Prior Publication Data
US 2011/0010764 A1 Jan. 13, 2011

(51) Int. Cl.
*H04L 29/06* (2006.01)
*H04W 12/06* (2009.01)
*H04L 9/32* (2006.01)
*H04W 84/02* (2009.01)

(52) U.S. Cl.
CPC .......... *H04L 63/0815* (2013.01); *H04L 9/3273* (2013.01); *H04W 12/06* (2013.01); *H04L 2209/76* (2013.01); *H04L 2209/80* (2013.01); *H04W 84/02* (2013.01)

(58) Field of Classification Search
USPC ........................................................ 713/168
See application file for complete search history.

(56) References Cited

U.S. PATENT DOCUMENTS

| | | | | |
|---|---|---|---|---|
| 6,069,877 A * | 5/2000 | Yang | ................... | H04W 60/005 370/252 |
| 6,256,497 B1 * | 7/2001 | Chambers | .......... | H04B 7/18563 455/430 |
| 6,826,414 B1 * | 11/2004 | Reynolds | .............. | H04W 48/02 455/432.1 |
| 6,968,193 B2 * | 11/2005 | Van Loon | ............. | H04W 8/082 455/455 |
| 7,110,747 B2 * | 9/2006 | Jain | .......................... | H04K 1/00 340/5.21 |
| 7,194,763 B2 * | 3/2007 | Potter | ..................... | H04L 63/08 380/247 |
| 7,206,576 B2 * | 4/2007 | Jain | ....................... | H04W 12/06 455/435.1 |

(Continued)

*Primary Examiner* — David García Cervetti
(74) *Attorney, Agent, or Firm* — Patti & Malvone Law Group, LLC (57) ABSTRACT

A one-pass authentication mechanism and system for heterogeneous networks are provided. The mechanism comprises authenticating a user based on an authentication key and an authentication algorithm in response to a request of the user to register a first network, wherein the authentication key and the authentication algorithm are associated with a first user identity for the first network and a second user identity for a second network; and if the authentication is successful, then comparing the first user identity retrieved from an authentication database through the second user identity provided by the user to the first user identity provided by the user in the authentication, in response to a request of the user to register the second network, and setting up security associations between the user and the second network if the retrieved first user identity matches the first user identity provided by the user.

15 Claims, 4 Drawing Sheets

(56) References Cited

U.S. PATENT DOCUMENTS

| | | | | |
|---|---|---|---|---|
| 7,313,381 B1* | 12/2007 | Lemilainen | G06Q 20/027 | 380/30 |
| 7,408,942 B1* | 8/2008 | Allahwerdi | H04W 92/02 | 370/401 |
| 7,522,907 B2* | 4/2009 | Lupper | H04M 15/49 | 370/328 |
| 7,525,930 B2* | 4/2009 | Fridman | H04W 8/28 | 370/254 |
| 7,743,404 B1* | 6/2010 | Deutschmann | H04L 63/0815 | 709/225 |
| 7,873,661 B2* | 1/2011 | Schulke | H04L 67/32 | 707/716 |
| 7,929,993 B2* | 4/2011 | Nagarajan | H04W 8/18 | 455/349 |
| 7,930,253 B1* | 4/2011 | Schoenhals | G06Q 30/0601 | 705/26.1 |
| 2004/0224666 A1* | 11/2004 | Jain | H04W 12/06 | 455/411 |
| 2005/0027989 A1* | 2/2005 | Sandhu | H04L 63/045 | 713/182 |
| 2005/0096014 A1* | 5/2005 | Jain | H04W 12/06 | 455/411 |
| 2006/0133319 A1* | 6/2006 | Kant | H04L 63/10 | 370/331 |
| 2007/0064647 A1* | 3/2007 | Prasad | H04L 63/0869 | 370/331 |
| 2007/0070958 A1* | 3/2007 | Rinne | H04W 12/06 | 370/338 |
| 2007/0076879 A1* | 4/2007 | Asokan | H04L 9/0844 | 380/255 |
| 2007/0180242 A1* | 8/2007 | Nagaraj | H04W 24/00 | 713/168 |
| 2008/0130523 A1* | 6/2008 | Fridman | H04W 8/28 | 370/259 |
| 2009/0022152 A1* | 1/2009 | Henry | H04L 29/1233 | 370/389 |
| 2009/0061932 A1* | 3/2009 | Nagarajan | H04W 8/18 | 455/558 |
| 2009/0285200 A1* | 11/2009 | Dekeyser | H04L 29/06027 | 370/352 |

* cited by examiner

Fig.5

ONE-PASS AUTHENTICATION MECHANISM AND SYSTEM FOR HETEROGENEOUS NETWORKS

FIELD OF THE INVENTION

The present invention generally relates to the field of authentication and, more particularly, the invention relates to a one-pass authentication mechanism and system for heterogeneous networks.

BACKGROUND OF THE INVENTION

The next generation communication networks are characterized by the co-existent of the variety of network architectures due to the diverse requirements for data rate, radio coverage, deployment cost and multimedia service. The 3GPP (3rd Generation Partnership Project) is actively specifying the roaming mechanism in the integrated Wireless LAN (Local Area Network)/UMTS (Universal Mobile Telecommunication System) networks. It should be noted that this scenario is only a specific heterogeneous network. The IEEE 802.16 standard (WiMAX) is an emerging broadband wireless access system specified for Wireless Metropolitan Area Networks (Wireless MAN) bridging the last mile, replacing costly wire line and also providing high speed multimedia services. Multimedia service provisioning is one of the primary demands and motivations for the next generation networks. To achieve this goal, the IP Multimedia Subsystem (IMS) is added as the core network part providing the multimedia service, e.g. voice telephony, video conference, realtime streaming media, interactive game, and instant messaging. The multimedia session management, initialization and termination are specified and implemented in the Session Initiation Protocol (SIP).

WiMAX and IMS are used in global market now. WiMAX supports Internet protocol (IP) multimedia services through IMS. Operators and vendors are all interested in how a WiMAX mobile station (MS) accesses to IMS and how to improve user experience. Since the IMS information is delivered through the WiMAX transport network, a WiMAX MS must activate WiMAX IP Connectivity Access Network (IP-CAN) session before it can register to the IMS network. The substantial technical challenge is to design and implement the security architectures and protocols across such heterogeneous networks taking into account the performance of the network and experience of subscribers. For example, one of the most important features in the framework of network security management is mutual authentication mechanism that a subscriber is able to authenticate a network, and the network is also able to authenticate the subscriber.

Figure 1:
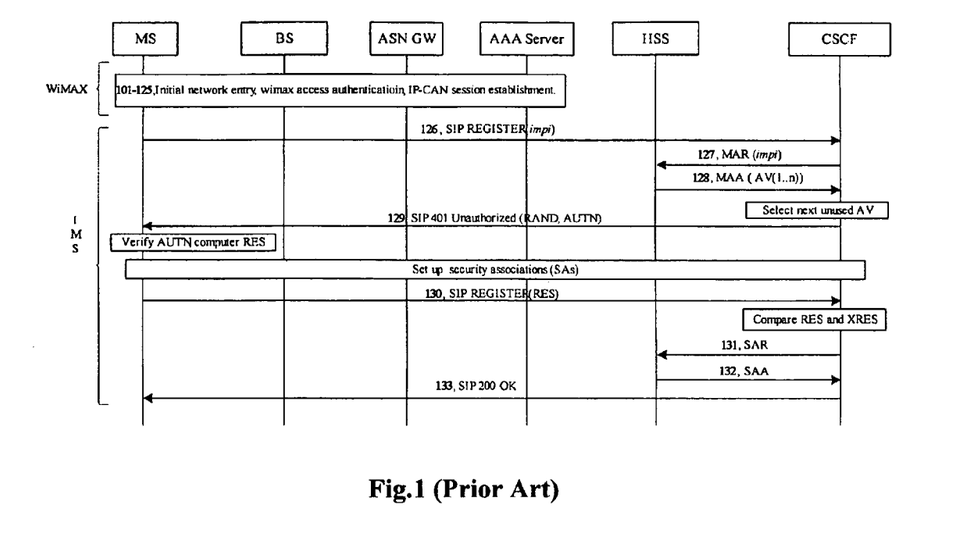
FIG. 1 is an exemplary message flow diagram illustrating a two-pass WiMAX and IMS authentication procedure of the prior art.

In the related WiMAX forum and 3GPP specifications, authentication is performed at both WiMAX network level and IMS network level before a MS can access to IMS services. For example, Extensible Authentication Protocol-Authentication and Key Agreement (EAP-AKA) can be employed to authenticate WiMAX MS at the WiMAX network level, while IMS-AKA is the authentication method at IMS level, as illustrated in FIG. 1. It is very clear that this full authentication procedure includes two independent sub-procedures, i.e. an authentication sub-procedure at WiMAX IP-CAN level (see upper part of FIG. 1) and another authentication sub-procedure at IMS level (see lower part of FIG. 1). For simplicity, we call this full authentication procedure a "two-pass" authentication procedure. The technical problem is how to design a one-pass WiMAX and IMS authentication mechanism that can be used when a MS accesses to IMS via WiMAX.

There are no existing one-pass WiMAX and IMS authentication mechanism available currently. Yi-Bing Lin and etc. propose a one-pass authentication procedure in "One-Pass GPRS and IMS Authentication Procedure for UMTS," IEEE Journal on selected areas in communications, vol. 23, no. 6, pp. 1233-1239, June, 2005. However, this paper only involves a one-pass GPRS and IMS authentication procedure for UMTS and can not work for WiMAX. In addition, the above proposition is limited because it does not propose how to set up security associations between MS and Proxy Call Session Control Function (P-CSCF), and it does not prove that a user correctly authenticates the IMS network.

On the other hand, the existing solution for WiMAX and IMS authentication is the normal "two-pass" authentication procedure, which brings more network traffic such as registration/authentication traffic than a "one-pass" authentication procedure.

SUMMARY OF THE INVENTION

The objective of the present invention is to provide a one-pass authentication mechanism and system for heterogeneous networks, specifically, to provide a one-pass authentication mechanism that can be used when a MS accesses to IMS via WiMAX. The one-pass WiMAX and IMS authentication mechanism proposed only needs to perform WiMAX authentication, and thus can significantly reduce the IMS registration/authentication traffic, improve performance of the network and promote experience of subscribers.

In one aspect of the present invention, there is provided a one-pass authentication mechanism for heterogeneous networks. This mechanism comprises authenticating a user based on an authentication key and an authentication algorithm in response to a request of the user to register a first network, wherein the authentication key and the authentication algorithm are associated with a first user identity for the first network and a second user identity for a second network; and if the authentication is successful, then comparing the first user identity retrieved from an authentication database through the second user identity provided by the user to the first user identity provided by the user in the authentication, in response to a request of the user to register the second network, and setting up security associations between the user and the second network if the retrieved first user identity matches the first user identity provided by the user.

In another aspect of the present invention, there is provided a one-pass authentication system for heterogeneous networks. This system comprises an authentication database, which stores a first user identity for a first network, a second user identity for a second network, and an authentication key and an authentication algorithm associated with the first and second user identities; a first authentication server adapted to authenticate a user based on the authentication key and the authentication algorithm in response to a request of the user to register the first network; and a second authentication server adapted to compare the first user identity retrieved from the authentication database through the second user identity provided by the user to the first user identity provided by the user in the authentication, in response to a request of the user to register the second network, and set up security associations between the user and the second network if the retrieved first user identity matches the first user identity provided by the user.

BRIEF DESCRIPTION OF THE DRAWINGS

The novel features of the invention are set forth in the appended claims. The invention itself, further objectives, and advantages thereof, will be best understood by reference to the following detailed description of the preferred embodiments when read in conjunction with the accompanying drawings, wherein:

DETAILED DESCRIPTION OF THE INVENTION

FIG. 1 is an exemplary message flow diagram illustrating a two-pass WiMAX and IMS authentication procedure of the prior art. In FIG. 1, authentication is performed at both WiMAX network level and IMS network level before a MS can access to IMS services, as indicated above. At the WiMAX network level, for example, EAP-AKA is employed to perform an authentication procedure for WiMAX MS. This authentication procedure consists of initial network entry, WiMAX access network authentication and IP-CAN session establishment procedures, which is represented by steps 101~125 in FIG. 1 and will be further discussed with respect to FIG. 3 hereafter. At the IMS network level, however, the MS needs to be authenticated through another authentication procedure such as IMS-AKA depicted by steps 126~133. Since some steps in this "two-pass" authentication procedure are identical, the present invention proposes a one-pass authentication procedure that only needs to perform WiMAX authentication. At the IMS level, authentication is implicitly performed in IMS registration. Such authentication mechanism may save at least 25% and up to 50% of the IMS registration/authentication network traffic, as compared with the two-pass procedure, which will be explained in FIG. 4.

Under the present invention, for WiMAX user authentication at the WiMAX network level, MS shall support at least one of EAP-AKA or EAP-TTLS as specified in the WiMAX NWG specification titled as "WiMAX Forum Network Architecture stage 3, Detailed Protocols and Procedures". When EAP-AKA is used for WiMAX user authentication, MS shall support the authentication procedure described in "Extensible Authentication Protocol Method for 3rd Generation Authentication and Key Agreement (EAP-AKA)", IETF RFC4187, January 2006, and the Subscriber Credentials (SUBC) (which are used to authenticate the WiMAX subscription) shall be the credential used in generation of authentication vectors defined in RFC4187. In addition, the NWG specification specifies that the format of SUBC depends on deployment and SUBC is known by the home network and the MS. However, the NWG specification does not define the format of SUBC.

In the context of this invention, it is assumed that EAP-AKA is used for WiMAX user authentication and SUBC is the same as the long-term security key K used in IMS authentication. In other words, WiMAX authentication procedure and IMS authentication procedure use the same authentication key K and authentication functions (which are used to generate the authentication vectors). The assumption is reasonable when the WiMAX network and the IMS network belong to the same operator or the WiMAX network operator gets an agreement with the IMS network operator.

Based on these assumptions, we can draw the following conclusions. First, in the two pass authentication procedure, user authentication is performed at the WiMAX network level firstly, and then authentication is performed at the IMS network level. Since IMS-AKA is used for IMS authentication and EAP-AKA method is used for WiMAX authentication, most of the steps in this "two-pass" authentication procedure are identical. Second, WiMAX authentication procedure and IMS authentication procedure use the same authentication key K and authentication functions. Therefore, when WiMAX user has been successfully authenticated at the WiMAX network level, it is implied that the long-term pre-shared IMS security key K in WiMAX terminal is the same as that in IMS network (which can be found in Home Subscriber Server (HSS)), i.e. mutual authentication is achieved between the MS and the IMS network.

From the conclusions above, it can be understood the proposed one-pass authentication procedure only needs to perform WiMAX authentication. At the IMS level, authentication is implicitly performed in IMS registration. It will be formally proved hereafter that the one-pass procedure achieves mutual authentication between the MS and the network at the IMS level. It will also be evaluated how much that the present invention saves the WiMAX/IMS authentication traffic.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 2:
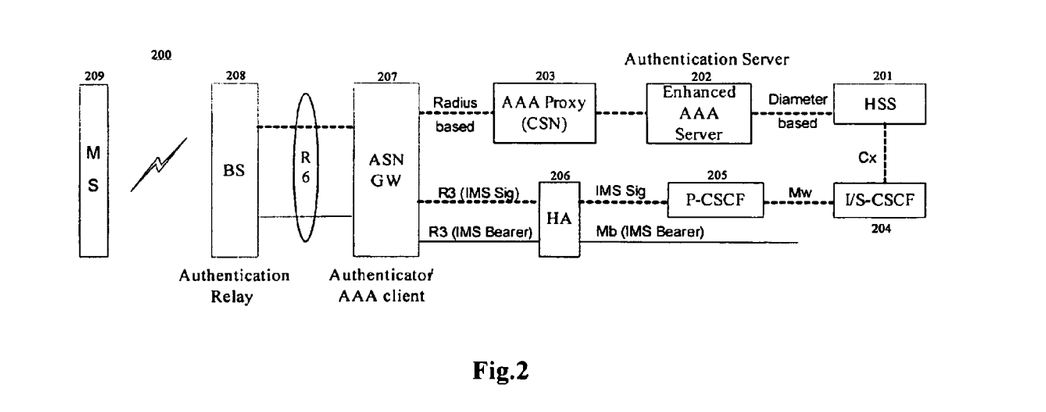
FIG. 2 shows schematically a functional architecture for a one-pass authentication mechanism in accordance with an embodiment of the present invention.

Reference is now made to FIG. 2, which shows schematically a functional architecture 200 for a one-pass authentication mechanism in accordance with an embodiment of the present invention. As shown in FIG. 2, functional architecture 200 may comprise various related functional entities and interfaces, such as enhanced Authentication Authorization Accounting (AAA) server 202 for WiMAX authentication and Interrogating/Serving Call Session Control Function (I/S-CSCF) 204 for IMS authentication. Such enhanced AAA server 202 has a Diameter based interface able to retrieve authentication parameters such as authentication vectors from HSS 201. AAA proxy 203 in Connectivity Service Network (CSN) proxies the authentication messages between Access Service Network Gateway (ASN GW) 207 and enhanced AAA server 202 in WiMAX network. In IMS network, for example, I/S-CSCF 204 can invoke the authentication vector distribution procedure by Cx message delivery with the HSS 201. Home Agent (HA) 206 and P-CSCF 205 can assist in communications between ASN GW 207 and I/S-CSCF 204. BS 208 facilitates interactions between MS 209 and communication networks via ASN GW 207.

In one exemplary embodiment, when a WiMAX subscriber is also an IMS subscriber, and the subscriber uses the same MS to access to WiMAX and IMS network, it is assumed that:

(1). EAP-AKA is used for WiMAX user authentication.

(2). SUBC (that is the long-term security key used in WiMAX user authentication) is the same as the long-term pre-shared security key K used in IMS authentication, and the SUBC (K) is stored in the MS and the HSS.

(3). Besides the authentication key K, authentication functions are shared between WiMAX and IMS authentication level. In other words, WiMAX authentication procedure and IMS authentication procedure use the same authentication functions and the same authentication key K.

(4). AAA server is enhanced with a Diameter based interface to retrieve authentication vectors from the HSS. This enhanced AAA server may be a subset of the 3GGP AAA server in 3GPP I-WLAN specification (TS 23.234). The Wx interface of 3GPP AAA server can be used to retrieve the authentication vectors from the HSS. Therefore the 3GPP AAA server can be reused in the solution of the present invention.

(5). When a WiMAX user subscribes to IMS services, the IMS operator assigns an IMSI value imsi besides an IMPI value impi to the user. In other words, the WiMAX MS has the IMSI value imsi and the IMPI value impi, and the HSS also stores the imsi and impi for the corresponding user/MS. The imsi is used to locate K value k at WiMAX network authentication level, while impi is used to locate K value k at IMS network authentication level. As illustrated in assumption (2) & (3), the imsi and impi are associated with the same K value k and authentication functions. In the WiMAX MS, the imsi will be used to get the outer-identity/inner-identity (which is used in EAP based authentication at WiMAX network level).

(6). In the approach of the present invention, the ASN GW can implement a SIP application level gateway (ALG) that may modify the format of SIP messages (to be elaborated at step 326 in FIG. 3).

The assumption is reasonable when the WiMAX network and IMS network belong to the same operator or the WiMAX network operator gets an agreement with the IMS network operator.

Thus, considering the functional architecture in FIG. 2, at the network level, MS 209 is authenticated by the enhanced AAA server 202, which can retrieve authentication vectors based on the MS's IMSI value imsi from HSS 201. AAA proxy in CSN 203 can proxy the authentication messages between the ASN GW 207 and the enhanced AAA server 202. At the IMS network level, MS 209 is authenticated by the S-CSCF 204, which can retrieve authentication vectors based on the MS's IMPI value impi from HSS 201. As shown in assumption (2) & (3), HSS 201 and WiMAX MS 209 share the same long-term security key K and authentication functions which are associated with impi (which is used at the IMS authentication level) and imsi (which is used at the WiMAX network authentication level) assigned to MS 209 by networks.

In the following detailed description of exemplary embodiments of the present invention, it will be illustrated how to authenticate a WiMAX MS at both the WiMAX network level and the IMS network level through a one-pass authentication mechanism.

Figure 3:
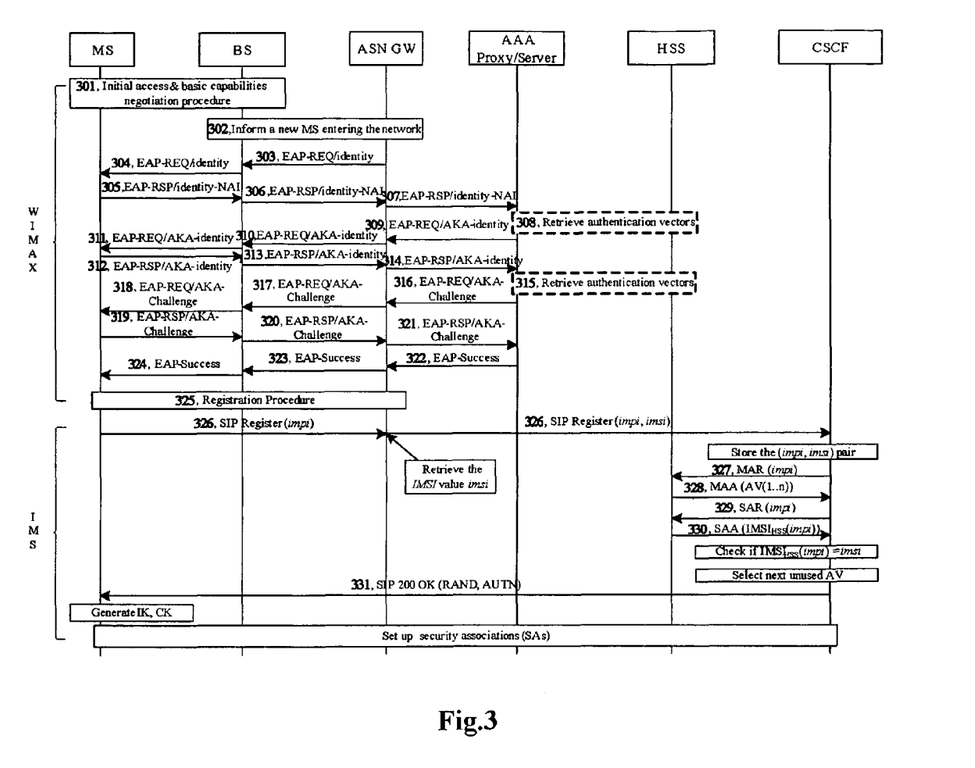
FIG. 3 is an exemplary message flow diagram illustrating a one-pass WiMAX and IMS authentication procedure in accordance with an embodiment of the present invention.

With reference now to FIG. 3, an exemplary message flow diagram of a one-pass WiMAX and IMS authentication procedure is depicted in accordance with an embodiment of the present invention. The procedure consists of two parts in which WiMAX part illustrates authentication procedure at WiMAX network level, while IMS part shows the authentication procedure at IMS network level. It should be noted that in this procedure, the MS interacts with the S-CSCF possibly through P-CSCF and I-CSCF. To simplify the discussion, FIG. 3 uses the term "CSCF" to represent the proxy, interrogating, and service functions of CSCF.

Once initialization for WiMAX wireless link access is finished and basic capabilities negotiation has been successfully established between a MS such as MS 209 and a WiMAX BS such as BS 208, as shown in step 301, the BS informs the ASN GW such as ASN GW 207 about the new MS entering the network in step 302.

In order to request the identity of the MS, the ASN GW may send an EAP-Request/Identity message to the MS through the BS, as shown in steps 303 and 304. Then the MS sends EAP-Response/Identity with its outer-identity complying with the format specified in "WiMAX Forum Network Architecture stage 3, Detailed Protocols and Procedures" back to the ASN GW through the BS, as shown in steps 305 and 306. Outer-identity contains either a pseudonym allocated to the MS in previous authentication or, in the case of first authentication, the IMSI value imsi. The username field of outer-identity complies with 3GPP TS 23.003 to indicate that the EAP-AKA authentication method is used. The username field of the outer-identity could be "0<imsi>@WiMAX. mnc<MNC>.mcc<MCC>.3gppnetwork.org" for EAP-AKA authentication, for example.

In step 307, the ASN GW analyses the outer-identity provided by the MS and stores the imsi for the WiMAX MS. The EAP-Response/Identity message is routed towards the proper enhanced AAA Server through one or several AAA proxies based on the realm part and Routing realm part of the outer-identity. The AAA proxies may modify the passing message complying with "WiMAX End-to-End Network Systems Architecture, (Stage 3: WiMAX-3GPP Interworking)" in WiMAX Forum.

The enhanced AAA Server identifies the subscriber as a candidate for authentication with EAP-AKA based on the received outer-identity, and then checks if it has an unused authentication vector available for the subscriber, as described in step 308. If the enhanced AAA server has unused authentication vector, then step 308 is skipped. If not, the enhanced AAA server sends a Diameter based message to a HSS such HSS 201 (with the parameter imsi). The HSS can use imsi to retrieve records (including long-term security key K value k and authentication functions, etc.) of the MS, and generate an ordered array of authentication vectors (e.g., RAND, AUTN, XRES, IK, CK) based on them. The HSS can send the AV array to the enhanced AAA server.

In steps 309 to 314, the enhanced AAA server requests again the user identity by using the EAP Request/AKA Identity message. The MS responds with the same identity (which is called inner-identity) it used in the EAP Response Identity message.

If no unused authentication vector is available for the WiMAX subscriber in step 315, the enhanced AAA server will retrieve an ordered array of authentication vectors (AVs) from the HSS as step 308.

In steps 316 to 318, the enhanced AAA server selects the next unused authentication vector from the ordered AV array and derives related private information such as master session key (MSK), extended master session key (EMSK), etc. from the CK, IK and the user identity. For example, the MSK, EMSK, etc. will be used at WiMAX network level to protect the user date channel. Then the enhanced AAA server sends an EAP-Request/AKA-Challenge message to the MS through the ASN GW and BS. The message contains parameters in attributes, which are a random number (AT_RAND), a network authentication token (AT_AUTN), and a message authentication code (AT_MAC).

On receipt of the EAP-Request/AKA-Challenge message, the MS runs the AKA algorithm based on the long-term security key k and authentication functions in the WiMAX MS, and verifies the AT_AUTN. If this is successful, the MS should generate authentication vectors (RES, CK, IK) and derive TEK, MSK, and EMSK. The MS then verifies the AT_MAC value sent by the enhanced AAA server. If successfully, the MS sends an EAP Response/AKA-Challenge message to the AAA server through the BS and ASN GW, as described in steps 319 to 321. The message contains AT_RES and AT_MAC.

The enhanced AAA server verifies that the AT_RES and the AT_MAC in the EAP-Response/AKA-Challenge packet are correct. If this is successful, the enhanced AAA server sends an EAP-Success message to the MS, as described in steps 322 to 324. At that time, the AAA server should include MSK in the message.

After successfully completing the basic access authentication procedure at the former steps, for the MS to be able to connect to IP network, the MS performs a WiMAX registration procedure in step 325. And then, if the WiMAX user is also an IMS subscriber the MS will perform the IMS registration procedure at the following steps.

In step 326, after P-CSCF discovery procedure, the MS sends a SIP REGISTER message with the parameter impi to the ASN GW through the BS. It should be noted that after WiMAX basic access authentication procedure, the ASN GW can identify the IMSI (user identity) value imsi of the MS that transmits data packets. The ASN GW retrieves the IMSI value imsi of the MS, as indicated in FIG. 3. And then the SIP ALG in the ASN GW adds the IMSI value imsi of the MS in the SIP REGISTER message and forwards it to the CSCF. The CSCF then stores the (imsi, impi) pair in the MS record.

Assume that the CSCF does not have the AVs for the MS. The CSCF invokes the authentication vector distribution procedure in step 327 by sending a Cx Multimedia Authentication Request message to the HSS along with the parameter impi. In step 328, the HSS uses the received impi as an index to retrieve records (including the long-term security key k and authentication functions) of the MS, and generates an ordered array of AVs. The HSS sends the AV array to the CSCF through a Cx Multimedia Authentication Answer message. Steps 327 and 328 are skipped if the CSCF already has the AV array.

In step 329, the CSCF sends a Cx Server Assignment Request message to the HSS with the parameter impi. The HSS uses the received impi as an index to retrieve imsi of the MS. The IMSI value retrieved from the HSS is denoted as $IMSI_{HSS}(impi)$. The HSS stores the CSCF name and sends a Cx Server Assignment Answer to the CSCF (with the parameters $IMSI_{HSS}(impi)$) in step 330.

In step 331, the CSCF checks whether the IMSI value imsi (CSCF stores at step 326) and $IMSI_{HSS}(impi)$ are the same. If so, the S-CSCF selects the next unused AV and sends a SIP 200 Ok message with RAND, CK and IK parameter of the AV to the P-CSCF, and the P-CSCF stores CK and IK and removes them and then forwards the rest of the SIP 200 OK message to the MS. If the imsi and $IMSI_{HSS}(impi)$ are different, then it implies that the registration is illegal. Upon receiving the 200 OK SIP message, the MS computes the session keys CK and IK based on k and the received RAND. Then the security associations between the MS and the P-CSCF are set up based on IK.

The existing solution for WiMAX and IMS authentication is the normal "two-pass" authentication procedure, as shown in FIG. 1, which brings more network traffic than the above "one-pass" authentication procedure. However, it can be observed from FIG. 1 and FIG. 3 that some steps in this "two-pass" authentication procedure are identical. Turning to FIG. 1, the steps of a two-pass WiMAX and IMS procedure are detailed as follows. Steps 101 to 125 in FIG. 1 are the same as steps 301 to 325 in FIG. 3, which consist of initial network entry, WiMAX access network authentication and IP-CAN session establishment procedures.

After P-CSCF discovery procedure, the MS sends a SIP REGISTER message to the CSCF along with the parameter impi through the WiMAX IP-CAN in step 126. If the CSCF does not have the AVs for the MS, the CSCF invokes the authentication vector distribution procedure by sending a Cx Multimedia Authentication Request message to the HSS along with the parameter impi in step 127. Then the HSS uses impi to retrieve records of the MS, and generate an ordered array of AVs. The HSS sends the AV array to the CSCF through a Cx Multimedia Authentication Answer message in step 128. Steps 127 and 128 are skipped if the CSCF already has the AV array.

In step 129, the CSCF selects the next unused authentication vector (including RAND, AUTN, XRES, IK, CK) from the ordered AV array and sends the parameters RAND and AUTN to the MS through a SIP 401 Unauthorized message. The MS checks whether the received AUTN can be accepted. If so, it produces a response RES and computes the session keys CK and IK. Then the security associations between MS and P-CSCF are set up. Then the MS sends RES back to the CSCF through a SIP REGISTER message in step 130.

The CSCF compares the received RES with the XRES. If they match, then the authentication and key agreement exchange is successfully completed. The CSCF then sends a Cx Server Assignment Request message to the HSS in step 131. Upon receipt of the Server Assignment Request, the HSS stores the CSCF name and replies a Cx Server Assignment Answer message to the CSCF in step 132. The CSCF then sends a SIP 200 OK message to the MS through the IP-CAN in step 133, and the IMS registration procedure is completed.

Table 1 compares the steps executed in the one-pass authentication procedure as illustrated in FIG. 3 and the two-pass authentication procedure as illustrated in FIG. 1.

TABLE 1

| One-Pass Procedure | | Two-Pass Procedure | |
|---|---|---|---|
| 326 | SIP REGISTER message | 126 | SIP REGISTER message |
| 327 | Diameter MAR message | 127 | Diameter MAR message |
| 328 | Diameter MAA message | 128 | Diameter MAA message |
| — | | 129 | SIP 401 Unauthorized message |
| — | | 130 | SIP REGISTER message |
| 329 | Diameter SAR message | 131 | Diameter SAR message |
| 330 | Diameter SAA message | 132 | Diameter SAA message |
| 331 | SIP 200 OK message | 133 | SIP 200 OK message |

Suppose that the expected SIP message delivery cost (network transmission cost) between the MS and the CSCF is one unit, and the expected Cx message delivery cost between the CSCF and the HSS is $\beta$ units. It is anticipated that $\beta<1$ for the following two reasons.

The CSCF and the HSS exchange the Cx messages through IP network. On the other hand, besides the IP network overhead, SIP communications between the MS and the CSCF involve WiMAX core network and radio network.

The CSCF and the HSS are typically located at the same location, while the MS is likely to reside at a remote location.

In the one-pass authentication procedure, if the distribution of authentication vectors from the HSS to the CSCF (Steps 327 & 328 in FIG. 3) is performed, then the expected IMS registration cost $C_{1,1}$ is expressed as $$C_{1,1}=2+4\beta \quad (1)$$

If the authentication vector distribution is not executed in the one-pass authentication procedure, then the expected IMS registration cost $C_{1,2}$ is expressed as $$C_{1,2}=2+2\beta \quad (2)$$

IMS registration is periodically performed. At steps 327 and 328 of the one-pass authentication procedure, an AV array of size n (where n≥1) is sent from the HSS to the CSCF. Therefore, one out of the n IMS registrations incurs the execution of steps 327 and 328. Therefore, from equations (1) and (2), the expected IMS registration cost $C_1$ for the one-pass authentication procedure is $$C_1 = \left(\frac{1}{n}\right)C_{1,1} + \left(\frac{n-1}{n}\right)C_{1,2} = 2 + \left(\frac{n+1}{n}\right)2\beta \quad (3)$$

In the two-pass authentication procedure, if the authentication vector distribution (steps 127 & 128 in FIG. 1) is executed, then the expected IMS registration cost $C_{2,1}$ is expressed as $$C_{2,1}=4+4\beta \quad (4)$$

If the authentication vector distribution is not executed in the two-pass authentication procedure, then the expected IMS registration cost $C_{2,2}$ is expressed as $$C_{2,2}=4+2\beta \quad (5)$$

As the one-pass authentication procedure, one out of the n IMS registrations incurs the execution of steps 127 and 128 for the two-pass authentication procedure. Therefore, from equations (4) and (5), the expected IMS registration cost $C_2$ for the two-pass authentication procedure is $$C_2 = \left(\frac{1}{n}\right)C_{2,1} + \left(\frac{n-1}{n}\right)C_{2,2} = 4 + \left(\frac{n+1}{n}\right)2\beta \quad (6)$$

From equations (3) and (6), the traffic-cost saving S of the one-pass authentication procedure over the two-pass authentication procedure is $$S = \frac{C_2 - C_1}{C_2} = \frac{n}{2n + (n+1)\beta} \quad (7)$$

Figure 4:
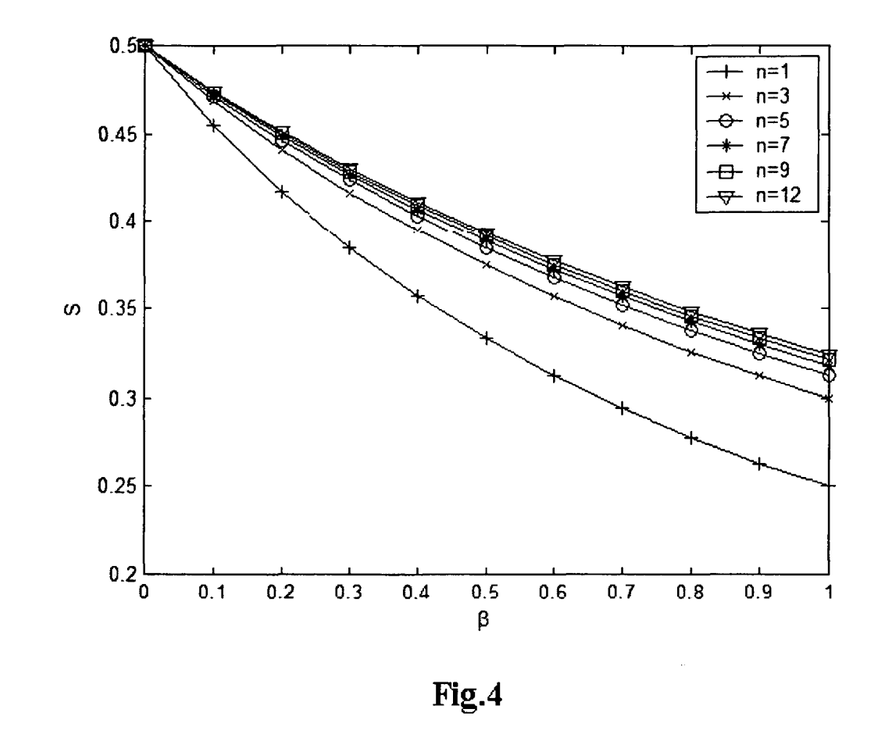
FIG. 4 is a diagram representation depicting traffic-cost saving of the one-pass procedure over the two-pass procedure in accordance with an embodiment of the present invention.

From the above analysis, a diagram representation depicting traffic-cost saving of the one-pass authentication procedure over the two-pass authentication procedure is provided in FIG. 4, in accordance with an embodiment of the present invention. Taking a user requesting to access IMS network via WiMAX network as an example, FIG. 4 plots S as a function of n and β based on equation (7). The figure indicates that compared with the two-pass authentication procedure, the proposed one-pass authentication procedure can save up to 50% and at least 25% of the network traffic generated by the IMS registration/authentication.

Figure 5:
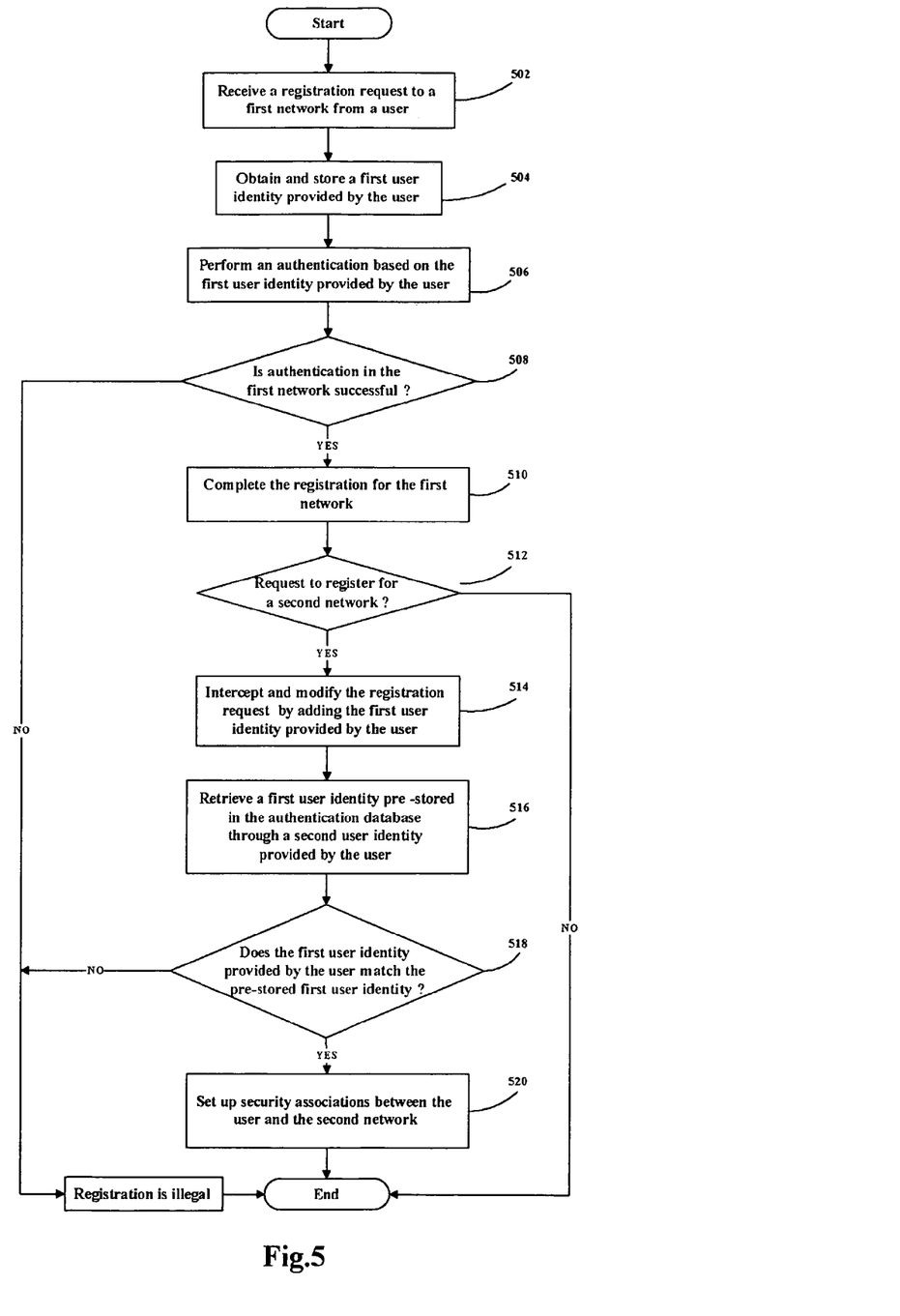
FIG. 5 is a schematic flow chart illustrating a one-pass authentication mechanism in accordance with an embodiment of the present invention.

FIG. 5 is a schematic flow chart illustrating a one-pass authentication mechanism in accordance with an embodiment of the present invention. In this one-pass authentication mechanism, it is assumed that a first network and a second network share the same authentication key K and authentication functions, and respective user identities assigned to a user for different networks are associated with such authentication key K and authentication functions. The authentication key K and authentication functions thus can be located by the corresponding user identity in the respective network. Therefore, if the user identities provided by the user match the user identities pre-stored in an authentication database for the first and second networks, respectively, then these user identities will correspond to the same authentication key K and authentication functions. With this mechanism, if a user requests to register for a first network and further wants to access a second network via the first network, it does not need to perform additional authentication in the second network when an authentication for this user is successful in the first network. This is because the authentication in the second network can be implicitly performed in a registration procedure for the second network. The following section will formally prove that the second network can correctly authenticate the user and this user can correctly authenticate the second network through the inventive one-pass authentication procedure.

Considering a WiMAX-IMS architecture illustrated in FIG. 2, every MS maintains the attributes IMSI, IMPI, and the long-term pre-shared secret key K. Given a MS such as MS 209 with IMSI=imsi, IMPI=impi, and K=k. To simplify the discussion, it is assumed that these parameters are grouped into a set $R_{MS}=\{\text{imsi, impi, k}\}$ in the MS. Define functions $IMSI_{MS}$, $IMPI_{MS}$ and $K_{MS}$ such that for any $x \in R_{MS}$ $$IMSI_{MS}(x)=imsi, \text{ where imsi is the IMSI value in } R_{MS} \quad (8)$$

$$IMPI_{MS}(x)=impi, \text{ where impi is the IMPI value in } R_{MS} \quad (9)$$

$$K_{MS}(x)=k, \text{ where k is the K value in } R_{MS} \quad (10)$$

Similarly, for every MS in the architecture illustrated in FIG. 2, HSS 201 maintains a record $R_{HSS}$ that consists of attributes IMSI, IMPI and K of the MS. That is, $$R_{HSS}=\{\text{imsi,impi,k}\}=R_{MS}.$$

Also define functions $IMSI_{HSS}$, $IMPI_{HSS}$ and $K_{HSS}$ such that for any $x \in R_{HSS}$ $$IMSI_{HSS}(x)=imsi, \text{ where imsi is the IMSI value in } R_{HSS} \quad (11)$$

$$IMPI_{HSS}(x)=impi, \text{ where impi is the IMPI value in } R_{HSS} \quad (12)$$

$$K_{HSS}(x)=k, \text{ where k is the K value in } R_{HSS} \quad (13)$$

The AKA authentication mechanism used in the invention is described in 3GPP TS 33.102, "3rd Generation Partnership Project; Technical Specification Group Services and System Aspects; 3G Security; Security Architecture". It achieves mutual authentication by the user and the network showing knowledge of a long-term secret key K which is shared between MS and HSS. For the WiMAX-IMS-interworking network architecture showed in FIG. 2, the mutual authentication at the WiMAX network level and the IMS network level are based on the following theorems.

Theorem 1: The MS is a legal WiMAX user and it successfully authenticates the WiMAX network if $K_{MS}(imsi)=K_{HSS}(imsi)$. And it is clear that if mutual authentication is successfully completed at WiMAX network level, then $K_{MS}(imsi)=K_{HSS}(imsi)$.

Theorem 2: The MS is a legal IMS user and it successfully authenticates the IMS network if $K_{MS}(impi)=K_{HSS}(impi)$.

Now, it will be proved that the one-pass authentication procedure (showed in FIG. 3) can achieve mutual authentication between the MS and the network at the IMS level (i.e. the one-pass authentication procedure can check if $K_{MS}(impi)=K_{HSS}(impi)$ according to Theorem 2).

In the one-pass authentication procedure in FIG. 3, when the mutual authentication is successfully completed at steps 301~325, then based on Theorem 1, it can be concluded that $$K_{MS}(imsi)=K_{HSS}(imsi) \qquad (14)$$

At step 326 in FIG. 3, the MS with IMPI value impi and secret key k claims that its IMSI value is imsi, i.e. $R_{MS}=\{imsi, impi,k\}$. From (9) and (10) it can be concluded that $$IMPI_{MS}(imsi)=IMPI_{MS}(k)=impi \qquad (15)$$

$$K_{MS}(imsi)=K_{MS}(impi) \qquad (16)$$

From steps 330 to 331, the HSS maps impi to the IMSI value $IMSI_{HSS}(impi)$, and the CSCF confirms that $$IMSI_{HSS}(impi)=imsi \qquad (17)$$

It should be noted that impi $\epsilon R_{HSS}$ and $IMSI_{HSS}(impi)$ $\epsilon R_{HSS}$. From (13), it can be concluded that $$K_{HSS}(impi)=K_{HSS}(IMSI_{HSS}(impi)) \qquad (18)$$

From (17) and (18), it can be concluded that $$K_{HSS}(impi)=K_{HSS} \qquad (19)$$

From (19) and (14), it can be concluded that $$K_{HSS}(impi)=K_{MS}(impi) \qquad (21)$$

From (20) and (16), it can be concluded that $$K_{HSS}(impi)=K_{MS}(impi) \qquad (21)$$

From (21) and based on Theorem 2, it can be concluded that the one-pass authentication procedure showed in FIG. 3 verifies that the MS is a legal IMS user and the IMS network is successfully authenticated by the MS, i.e. the one-pass authentication procedure achieves mutual authentication between the MS and the network at the IMS level.

In view of the above analysis, the one-pass authentication mechanism according the present invention is also applicable to other inter-working solutions where a user requests to access service and applications in a network such as IMS via another network such as WiMAX, GPRS, UMTS, WLAN and etc. With an assumption of the two networks sharing the same authentication key and authentication algorithm/functions, and respective user identities assigned to the user in different networks being associated with such authentication key and authentication algorithm/functions, the inventive authentication process starts by receiving a registration request to a first network from a user, as shown in step 502. Then the first network can obtain and store a first user identity provided by the user in step 504, wherein the first user identity is assigned to the user by the network operator for use in the first network, and it also stored in an authentication database such as HSS 201. Based on the first user identity, an authentication is performed in step 506 with the associated authentication key and functions according to an authentication agreement between the user and the first network. If the authentication is successful in step 508, the user completes the registration for the first network in step 510. Otherwise, it implies that the registration is illegal and the process ends.

If this user is also a subscriber of a second network which can be accessed via the first network, the user may send a registration request to the second network. In step 512, if the user requests to register for the second network, the process will continue to step 514 where the registration request is intercepted and modified by adding the first user identity provided by the user (stored in step 504). In step 516, a second user identity provided by the user for the registration will be used to retrieve a first user identity pre-stored in the authentication database when assigned to the user. A determination is made as to whether the first user identity provided by the user (i.e. the first user identity stored in step 504) matches the first user identity pre-stored in the authentication database. In step 518, if the first user identity provided by the user matches the pre-stored first user identity, then security associations between the user and the second network are set up in step 520 based on an authentication agreement between them. Otherwise, it implies that the registration is illegal and the process ends.

The foregoing descriptions of the specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of one-pass authentication mechanism for heterogeneous networks, comprising the steps of:
   authenticating a user based on an authentication key and an authentication algorithm in response to a request of the user to register a first network, wherein the authentication key and the authentication algorithm are associated with a first user identity for the first network and a second user identity for a second network; and when the authentication is successful, then
   comparing the first user identity retrieved from an authentication database through the second user identity provided by the user to the first user identity provided by the user in the authentication, in response to a request of the user to register the second network, and
   setting up security associations between the user and the second network when the retrieved first user identity matches the first user identity provided by the user;
   wherein the first network is a WiMAX network and the second network is an IP Multimedia Subsystem (IMS) network.

2. The method of claim 1, further comprising the steps of:
   intercepting the request of the user to register the second network, wherein the request contains the second user identity provided by the user; and
   before forwarding the request, modifying the request by adding the first user identity provided by the user in the authentication.

3. The method of claim 1, wherein the step of authenticating the user based on the authentication key and the authentication algorithm further comprises the steps of:
   selecting first authentication parameters for the user;
   performing verifications based on the first authentication parameters according to a first authentication agreement between the user and the first network; and
   performing a registration procedure of the first network for the user after performing the verifications successfully.

4. The method of claim 3, wherein the first authentication agreement shares the authentication key and the authentication algorithm with a second authentication agreement between the user and the second network.

5. The method of claim 4, wherein the step of setting up the security associations between the user and the second network is based on second authentication parameters for the user according to the second authentication agreement.

6. The method of claim 5, further comprising the step of generating the second authentication parameters based on records of the user retrieved from the authentication database through the second user identity provided by the user, wherein the records of the user include at least the authentication key and the authentication algorithm.

7. The method of claim 3, further comprising the step of generating the first authentication parameters based on records of the user retrieved from the authentication database through the first user identity provided by the user, wherein the records of the user include at least the authentication key and the authentication algorithm.

8. The method of claim 1, wherein the first network and the second network use the same authentication functions and the same authentication key.

9. A one-pass authentication system for heterogeneous networks, comprising:
- an authentication database adapted to store a first user identity for a first network, a second user identity for a second network, and an authentication key and an authentication algorithm associated with the first and second user identities;
- a first authentication server adapted to authenticate a user based on the authentication key and the authentication algorithm in response to a request of the user to register the first network; and
- a second authentication server adapted to compare the first user identity retrieved from the authentication database through the second user identity provided by the user to the first user identity provided by the user in the authentication, in response to a request of the user to register the second network, and set up security associations between the user and the second network when the retrieved first user identity matches the first user identity provided by the user;
- wherein the first network is a WiMAX network and the second network is an IP Multimedia Subsystem (IMS) network.

10. The system according to claim 9, further comprising an access gateway connected to the first and second authentication servers, wherein the access gateway is adapted to:
- intercept the request of the user to register the second network, wherein the request contains the second user identity provided by the user; and
- before forwarding the request, modify the request by adding the first user identity provided by the user in the authentication.

11. The system according to claim 9, wherein the first authentication server is further adapted to:
- select first authentication parameters for the user;
- perform verifications based on the first authentication parameters according to a first authentication agreement between the user and the first network; and
- perform a registration procedure of the first network for the user after performing the verifications successfully.

12. The system according to claim 11, wherein the first authentication agreement shares the authentication key and the authentication algorithm with a second authentication agreement between the user and the second network.

13. The system according to claim 12, wherein the second authentication server is further adapted to set up the security associations between the user and the second network based on second authentication parameters for the user according to the second authentication agreement.

14. The system according to claim 13, wherein the second authentication server is further adapted to access the second authentication parameters from the authentication database, and the authentication database is further adapted to:
- retrieve records of the user through the second user identity provided by the user, wherein the records of the user include at least the authentication key and the authentication algorithm; and
- generate the second authentication parameters based on the records of the user.

15. The system according to claim 11, wherein the first authentication server is further adapted to access the first authentication parameters from the authentication database, and the authentication database is further adapted to:
- retrieve records of the user through the first user identity provided by the user, wherein the records of the user include at least the authentication key and the authentication algorithm; and
- generate the first authentication parameters based on the records of the user.

* * * * *